Feb. 21, 1928.
H. C. PRIEBE
BRAKE GEARING FOR RAILWAY CARS
Filed Nov. 18, 1926
1,660,014
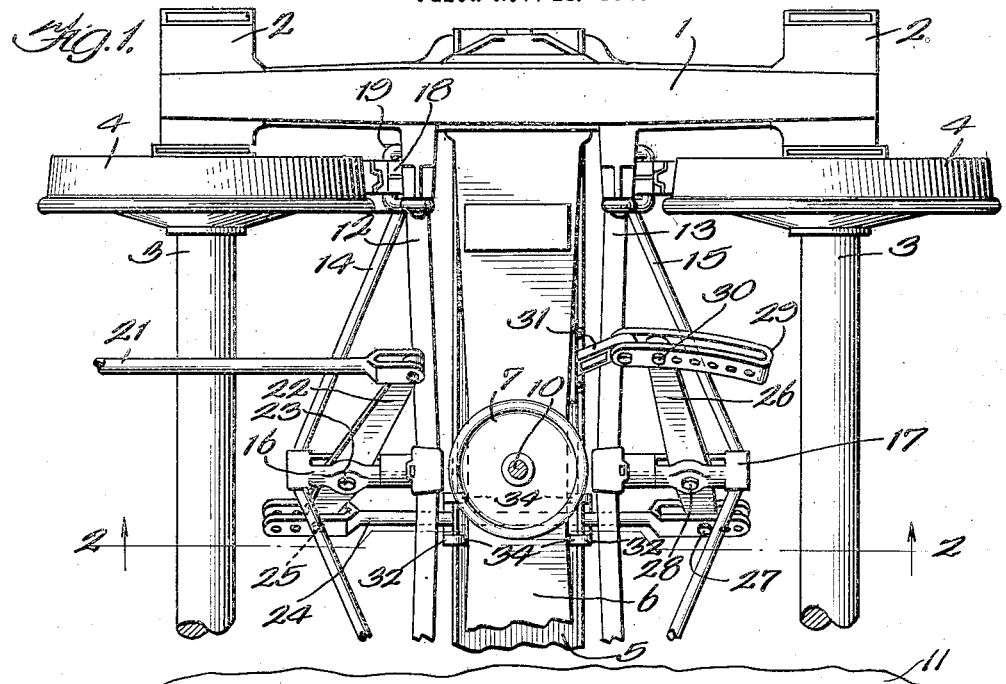
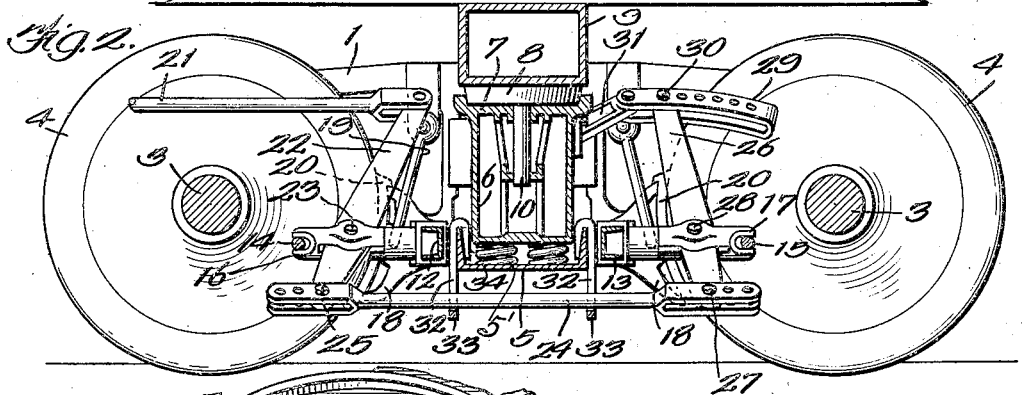
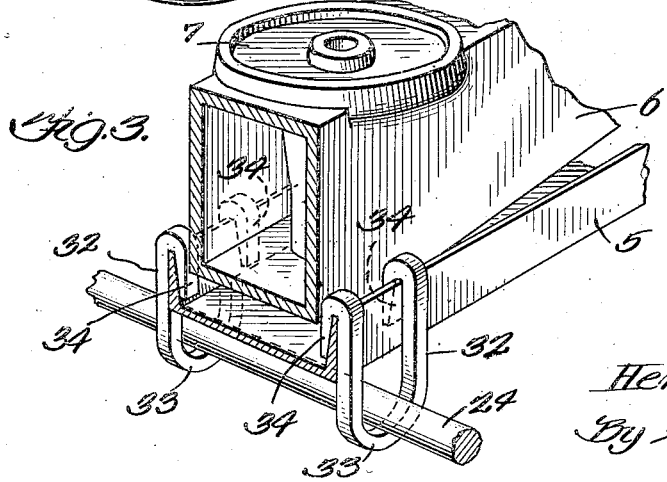
Inventor:
Herman C. Priebe Patented Feb. 21, 1928.

1,660,014

UNITED STATES PATENT OFFICE.

HERMAN C. PRIEBE, OF BLUE ISLAND, ILLINOIS.

BRAKE GEARING FOR RAILWAY CARS.

Application filed November 18, 1926. Serial No. 149,087.

My invention relates to brake gears for railway cars of the class employing brake shoe carrying brake beams arranged in pairs, a live lever for operating one of the brake beams of a pair, a dead lever for operating the other beam, and a connecting rod joining the lower ends of the brake levers.

The invention has for its object the provision of improved and simplified means for engaging and supporting the connecting rod in the event of its disconnection and preferably also serving to limit the extent to which it may be lowered upon the release of the brakes. In carrying out my invention, a spring plank of channel formation is employed, whose base wall underlies the truck bolster and whose side walls extend upwardly from said base wall and receive the truck bolster therebetween, one of the inner and opposite faces of the side walls of the spring plank sloping upwardly from the vertical and being spaced apart from the adjacent side face of the truck bolster to permit vertical play of this bolster. A suspending member is employed for the connecting rod having a portion underlying the connecting rod, said suspending member being bent at its upper end toward the truck bolster and freely entering the space between the truck bolster and the aforesaid side wall of the spring plank, the inner side of the bent upper end of said suspending member sloping similarly to the sloping inner face of said spring plank side wall. In the preferred embodiment of the invention the suspending member is formed of a rod bent into the form of a U-shaped loop whose base underlies the connecting rod and between whose sides the connecting rod passes, the ends of said loop being bent toward the truck bolster and freely entering the space between the truck bolster and the aforesaid side wall of the spring plank, the inner sides of said loop ends sloping similarly to the sloping inner face of said spring plank side wall.

I will explain my invention more fully by reference to the accompanying drawing in which Fig. 1 is a plan view of a portion of one form of truck showing the preferred embodiment of the invention employed in connection therewith; Fig. 2 is a sectional view on line 2—2 of Fig. 1; and Fig. 3 is a perspective view illustrating my invention as it is preferably embodied.

The truck is equipped with side frames of any suitable construction, one of these side frames being illustrated at 1. Each side frame is equipped with journal boxes, as indicated at 2, which house bearings that receive the ends of the axles 3 for the car wheels 4. The spring plank 5 is carried upon the lower portions of the side frames and carries the springs 5' which support the truck bolster 6. This bolster is provided with the female member 7 of the center bearing which receives the male center bearing member 8 that is provided upon the bottom of the body bolster 9. A king pin 10 depends from the center bearing member 8 and passes through the center bearing member 7 and the portion of the truck bolster below this latter member. A portion 11 of the car body is shown upon the body bolster.

The brake gear illustrated is inclusive of two cambered brake beams 12 and 13 located between the axles and which constitute the compression members of trusses, two rods 14 and 15, respectively connected with the ends of said beams and constituting truss tension members, and two struts 16 and 17 respectively interposed between the compression and tension members of the trusses. A brake head 18 is secured upon each end of each of the brake beams. Brake hangers in the form of links 19 depend from the upper portions of the side frames and carry the brake beams and the trusses of which these beams are parts, said hangers being suitably received, at their lower ends, in notches, provided in the brake heads. Brakes in the form of shoes 20 are carried upon the brake heads in a position to be applied to the car wheels when the trussed brake beams are moved toward the wheels. The truck bolster and spring plank are between the beams.

The brake actuating and releasing rod 21 is connected with the upper end of the live brake lever 22 which is pivotally connected between its ends at 23 with the strut 16 through which this lever desirably passes. The lower end of this lever is pivotally connected, at a selected place, with one end of the connecting rod 24, as indicated at 25 The other end of this connecting rod is similarly connected with the lower end of the dead brake lever 26, as indicated at 27. The lever 26 is pivotally connected, between its ends, with the strut 17, as indicated at 28. The upper end of the dead lever 26 is connected at a selected place with the dead lever guide or stop 29, indicated at 30, this guide or stop being pivotally connected, at its inner end, with the bracket 31 which is carried by the truck bolster. The brake beam 12 is directly controlled by the live lever 22 and strut 16 which indirectly control the movement of the brake beam 13 through the intermediation of the connecting rod 24, the dead lever 26 and strut 17. I prevent the connecting rod from unduly lowering upon release of the brakes or from dropping in the event of its disconnection by providing a suspension therefor that is supplied in addition to the brake levers, this suspension being carried by the truck independently of the levers whereby the extent to which the connecting rod may be lowered, with reference to the truck, is limited. The means for thus suspending the connecting rod desirably resides in two suspending means 32 each in the form of a rod bent into the form of a U-shaped loop whose base 33 underlies the connecting rod and between whose sides the connecting rod passes, the ends 34 of said loop being bent toward the truck bolster and freely entering the space between the truck bolster and the adjacent side wall of the spring plank, the inner sides of said loop ends sloping similarly to the sloping inner face of said spring plank side wall. In other words, the suspending means for the connecting rod may be described as being comprised of a rod bent into the form of a U-shaped loop whose base is adapted to underlie the connecting rod and between whose sides the connecting rod is adapted to be passed, the ends of said loop being bent downwardly in a plane transverse to the plane of said loop, the inner sides of the terminating portions of the loop sloping downwardly and inwardly toward the spring plank. The hooked upper ends of the main loop constitute minor loops that are included in planes extending along the connecting rod and while I have shown a complete loop 32, each terminating in hooked upper ends, the invention is not to be thus limited.

Having thus described my invention, I claim:

A support for a rod of a railway car braking mechanism, which mechanism includes a spring plank of channel form having upstanding side walls the inner faces of which are inclined upwardly and outwardly, and a bolster which is of substantially the same width as the distance between said side walls at their lower ends, vertically movable between said side walls, comprising a member the lower end portion of which is provided with means to receive and support said rod and the upper end portion of which is turned upon itself to provide a downwardly directed hook disposed in spaced relation to the main body portion of the member for engagement over one of the side walls of said spring plank, said hook being of downwardly tapering form such that, when said member is engaged with its main body portion against the outer face and with its hook against the inner face of one of the side walls of said spring plank, the inner face of said hook will lie snugly against the upwardly and outwardly inclined inner face of said side wall and the outer face of said hook will be disposed in a plane parallel to the plane of movement of the bolster to permit the latter to move into said channeled spring plank without harmful contact with the hook portion of said member.

In witness whereof, I hereunto subscribe my name.

HERMAN C. PRIEBE.